United States Patent
Trivedi et al.

(10) Patent No.: US 9,377,108 B2
(45) Date of Patent: Jun. 28, 2016

(54) VARIABLE STIFFNESS COMPLIANT PLATE SEAL

(71) Applicant: GENERAL ELECTRIC COMPANY, Schenectady, NY (US)

(72) Inventors: Deepak Trivedi, Schenectady, NY (US); Hrishikesh Vishvas Deo, New York, NY (US)

(73) Assignee: General Electric Company, Niskayuna, NY (US)

( * ) Notice: Subject to any disclaimer, the term of this patent is extended or adjusted under 35 U.S.C. 154(b) by 232 days.

(21) Appl. No.: 14/087,287

(22) Filed: Nov. 22, 2013

(65) Prior Publication Data
US 2015/0145216 A1    May 28, 2015

(51) Int. Cl.
*F16J 15/32* (2006.01)
*F01D 11/00* (2006.01)
*F01D 11/02* (2006.01)

(52) U.S. Cl.
CPC ........... *F16J 15/3292* (2013.01); *F01D 11/003* (2013.01); *F01D 11/02* (2013.01); *F05D 2240/56* (2013.01); *F05D 2240/59* (2013.01); *F16J 15/3284* (2013.01)

(58) Field of Classification Search
CPC . F16J 15/3284; F16J 15/3288; F16J 15/3292; F05D 2240/57; F05D 2240/59
USPC ........................................................ 277/355
See application file for complete search history.

(56) References Cited

U.S. PATENT DOCUMENTS

| | | | |
|---|---|---|---|
| 5,632,493 A | 5/1997 | Gardner | |
| 6,267,381 B1 | 7/2001 | Wright | |
| 6,505,837 B1 | 1/2003 | Heshmat | |
| 6,527,274 B2 | 3/2003 | Herron et al. | |
| 8,025,296 B2 | 9/2011 | Uehara et al. | |
| 8,162,324 B2 | 4/2012 | Deo et al. | |
| 8,205,889 B2 | 6/2012 | Verma et al. | |
| 8,250,756 B2 | 8/2012 | Adis et al. | |
| 8,382,120 B2 | 2/2013 | Deo et al. | |
| 8,794,632 B2 * | 8/2014 | Jahn | F16J 15/3292 277/303 |
| 2004/0150165 A1 * | 8/2004 | Grondahl | F16J 15/3292 277/355 |
| 2008/0042365 A1 | 2/2008 | Awtar et al. | |
| 2008/0042366 A1 | 2/2008 | Awtar et al. | |
| 2008/0169614 A1 | 7/2008 | Awtar et al. | |
| 2009/0196742 A1 | 8/2009 | Turnquist et al. | |
| 2010/0143102 A1 * | 6/2010 | Deo | F01D 11/003 415/173.1 |
| 2010/0158674 A1 | 6/2010 | Turnquist et al. | |
| 2010/0176556 A1 | 7/2010 | Mack et al. | |
| 2011/0123329 A1 * | 5/2011 | Takeuchi | F01D 11/001 415/230 |
| 2012/0049461 A1 * | 3/2012 | Deo | F01D 11/02 277/303 |
| 2012/0228153 A1 | 9/2012 | Luo et al. | |

(Continued)

OTHER PUBLICATIONS

D. Trivedi et al., "Vortex Induced Flutter in Compliant Plate Seals," Proceedings of ASME International Mechanical Engineering Congress and Exposition, IMECE2012-87022, Nov. 9-15, 2012, pp. 1-10.

*Primary Examiner* — Kristina Fulton
*Assistant Examiner* — Nicholas L Foster
(74) *Attorney, Agent, or Firm* — John P. Darling

(57) ABSTRACT

A compliant plate seal assembly for a turbo machine includes a rotor and a stationary component. A plurality of compliant plates are coupled circumferentially to the stationary component. A natural frequency of each compliant plate varies from a natural frequency of adjacent compliant plates and/or gaps between adjacent plates to produce a zero-oscillation state between adjacent compliant plates in flow.

17 Claims, 7 Drawing Sheets

(56) References Cited

U.S. PATENT DOCUMENTS

| | | | |
|---|---|---|---|
| 2012/0315138 A1* | 12/2012 | Rao | F01D 11/00 415/231 |
| 2013/0001886 A1 | 1/2013 | Roy et al. | |
| 2013/0022459 A1 | 1/2013 | Samudrala et al. | |
| 2013/0119612 A1* | 5/2013 | Jahn | F02C 7/28 277/402 |
| 2013/0119613 A1* | 5/2013 | Jahn | F16J 15/3292 277/402 |
| 2013/0313782 A1* | 11/2013 | Jahn | F16J 15/3288 277/309 |
| 2014/0138918 A1* | 5/2014 | Luo | F16J 15/3292 277/345 |
| 2015/0323077 A1* | 11/2015 | Franceschini | F16J 15/3292 277/355 |

* cited by examiner

VARIABLE STIFFNESS COMPLIANT PLATE SEAL

BACKGROUND

The present technology relates generally to a sealing structure between a rotating component and a stationary component and, more particularly, to a compliant plate seal arrangement that overcomes dynamic instabilities.

Dynamic sealing between a rotor (e.g., rotating shaft) and a stator (e.g., static shell or casing) is an important concern in turbomachinery. Several methods of sealing such as labyrinth seal, brush seal and compliant plate seal have been used. A non-contact labyrinth seal may be used. At certain sealing locations with large rotor transients, labyrinth seals are assembled with relatively large radial clearance to avoid contact of the labyrinth teeth with the rotor and further opening of the radial clearance. Known labyrinth seals are based on rigid members and have a high differential pressure capability, but their leakage is relatively large due to the large radial clearance.

Brush seals consist of tightly packed, cylindrical bristles that are arranged in a staggered arrangement to reduce leakage. The bristles have a low radial stiffness that allows them to move in the event of a rotor excursion while maintaining a tight effective clearance during steady state operation. Brush seals also have a low stiffness in the axial direction because of the generally cylindrical geometry of the bristles. When subject to a high differential pressure across the seal, the bristles deflect in the axial direction towards the low-pressure side. This opens up the radial clearance and leads to high leakage across the brush seal. Brush seals therefore are generally effective only up to a limited differential pressure across the seal. Moreover, the bristles of a brush seal rub against the rotor surface leading to abrasion wear and heating of the rotor and the bristles. As a result, the bristles have to be made out of expensive material with wear resistance at elevated temperatures. The abrasion wear leads to opening of the clearances and requires frequent replacement of the expensive brush seals. Rotor heating may also lead to rotor-dynamic instability.

Some known compliant plate seals have been used as an alternative to brush seals. Conventional compliant plate seals include compliant plates attached to a stator in a circumferential fashion around a rotor. Compliant plates have increased differential pressure capability due to larger axial stiffness to radial stiffness ratio of the compliant plates compared to bristles in brush seals. The differential pressure capability of conventional compliant plates is limited due to uncontrollable hydrostatic lift and blow-down phenomenon. The stability of compliant plate seals is also limited by a variety of instabilities, including aerostatic flutter, vortex induced flutter and divergence.

BRIEF DESCRIPTION

In accordance with one example of the technology disclosed herein, a compliant plate seal assembly for a turbo machine comprises a rotor; a stationary component; and a plurality of compliant plates coupled circumferentially to the stationary component, wherein each compliant plate has a natural frequency and at least one of a variation of the natural frequencies of the compliant plates or gaps between each compliant plate is configured to produce a zero-oscillation state between adjacent compliant plates in flow.

In accordance with another example of the technology disclosed herein, a method of reducing self-excited vortex induced vibrations in a compliant plate seal assembly of a turbo machine including a rotor and a stationary component comprises providing a plurality of compliant plates coupled circumferentially to the stationary component; and tuning a natural frequency of each compliant plate to vary from the corresponding natural frequency of adjacent compliant plates to produce a low-oscillation state between adjacent compliant plates in flow.

DRAWINGS

These and other features, aspects, and advantages of the present technology will become better understood when the following detailed description is read with reference to the accompanying drawings in which like characters represent like parts throughout the drawings, wherein.

DETAILED DESCRIPTION

Figure 1:
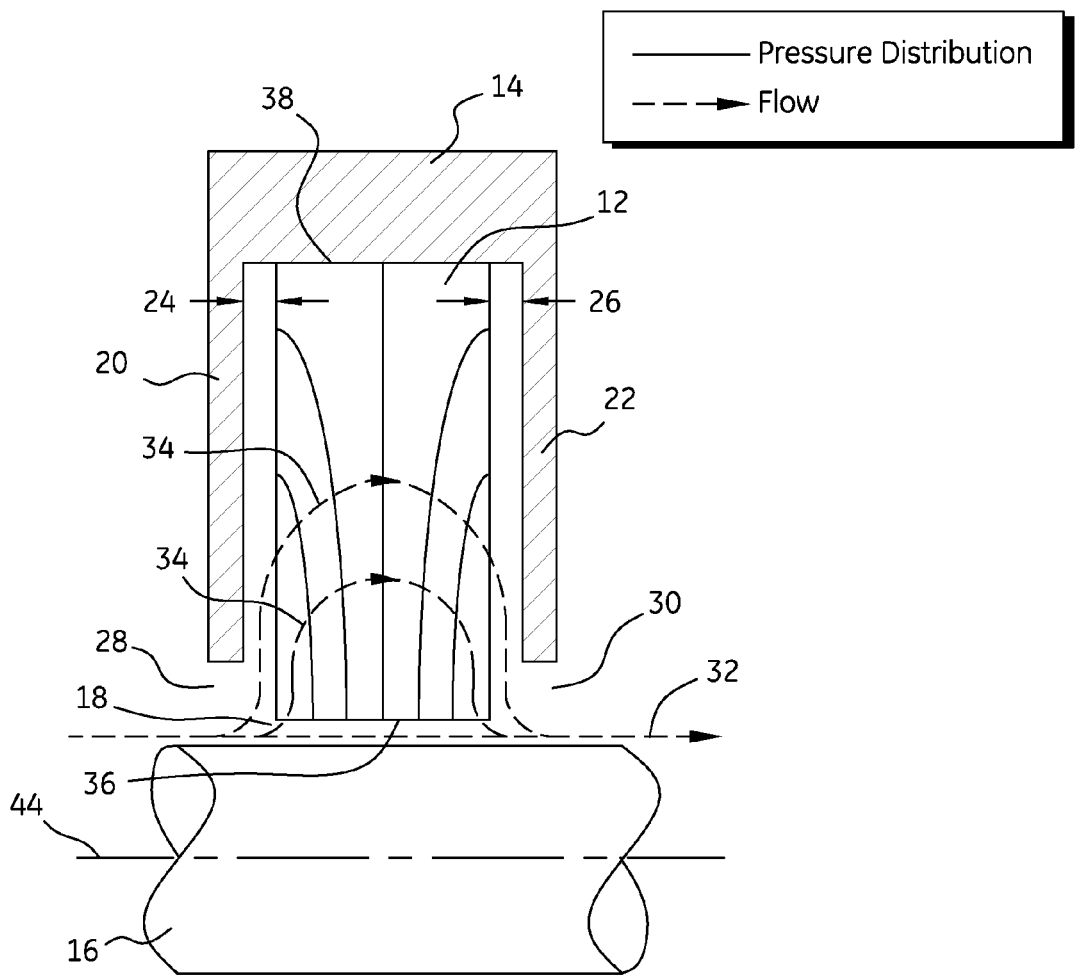
FIG. 1 illustrates a cross-sectional view conventional compliant plate seal.

The compliant plate seal assembly described herein may be used with any suitable rotary machine such as, but not limited to, gas turbines, steam turbines, compressors, aircraft engines and other turbomachinery. The seal assembly includes a plurality of compliant plates coupled circumferentially to a stationary component, wherein each of the plurality of compliant plates comprises a tip, a root, opposing first and second side surfaces, a leading surface at a high pressure side, a trailing surface at a low pressure side. FIG. 1 illustrates a conventional compliant plate seal 10. Conventional compliant plate seals 10 include compliant plates 12 attached to a stator 14 in a circumferential fashion around a rotor 16. There is a clearance between the tips of the compliant plates and the rotor that is referred as tip clearance 18. The tips of adjacent compliant plates 12 also have a small but finite gap so that they are free to move in the radial direction. The compliant plate seal 10 also includes a front plate 20 and a back plate 22 separated from the complaint plate stack by a small distance that can be referred as a front plate gap 24 and a back plate gap 26, respectively. The front plate 20 and back plate 22 have a relatively large radial clearance from the rotor 16 that is known as fence height. Conventional compliant plate seals include compliant plates attached to the stator at the seal outer diameter, in a circumferential fashion around the rotor.

The compliant plates 12 are substantially parallel to the axis 44 of the rotor 16. The compliant plates 12 can be oriented at an angle with respect to the radial direction of the rotor 16 such that the compliant plate 12 from the tip to the root leans towards the opposite direction of the of the shaft rotation. The root refers to the end of the compliant plate that is attached to the stator and the tip refers to the free end of the compliant plate 12 that is in close proximity to the rotor 16. The angle that the compliant plate 12 makes with the circumferential direction of the rotor 16 is known as the cant angle. The tips of adjacent compliant plates 12 have a small but finite gap between each other, so that they are free to move in the radial direction at the seal inner diameter, while keeping the leakage area small. The gaps between adjacent compliant plates 12 increase along the length of the plates, from the tip of the compliant plate to the root of the compliant plate.

The leakage flow from the high-pressure side 28 to the low-pressure side 30 consists of two components. A first component 32 is the flow through the tip clearance 18 and a second component 34 is the flow through the gaps between the adjacent compliant plates 12. The flow-field and the pressure profile resulting from this leakage flow depend on the geometry and the operating conditions such as pressure, fluid, RPM, and swirl. An exemplary flow field and pressure distribution is shown with arrows in FIG. 1. Close to the front plate 20, the second component of leakage flow 34 component is radially outward, and from high-pressure side 28 to low-pressure side 30. Close to the back plate 22 the second component of leakage flow 34 is radially inward and from high-pressure side 28 to low-pressure side 30.

The gaps between adjacent compliant plates 12 increase along the length of the plates, from the tip 36 of the compliant plate to the root 38 of the compliant plate. These gaps have a large flow area and a small flow-resistance to the leakage flow 34. The primary resistance to the second component of the leakage flow 34 is provided by the front plate gap 24 and back plate gap 26. In conventional compliant plates such as the seal 10 in FIG. 1, the differential pressure across the seal 10 (from high-pressure side to low-pressure side) causes either a lifting force or blow-down force on the compliant plates, depending on the ratio of the front plate gap 24 to the back plate gap 26. This force is referred to as the hydrostatic force.

The stability of compliant plate seals is limited by a wide variety of detrimental and potentially catastrophic instabilities, potentially including aeroelastic flutter, vortex induced flutter and divergence. The ability to eliminate or reduce the severity of these instabilities can lead to more stable design and expand the regime of operation of the seal. As shown in FIG. 1, prior art compliant plate seals typically designed to consist of a number of compliant plates with nominally identical natural frequencies. This introduces symmetries in the underlying dynamical system promoting seal instabilities in modes where compliant plates vibrate synchronously due to self-excitation in flow. Similar phenomena have been observed in a number of systems of coupled oscillators, including rotor blades.

An emergent phenomenon in coupled oscillators, for example rotor blades, is amplitude death, whereby a properly designed interaction between the oscillators causes the system to stop oscillating, and the zero-oscillation state is the only stable solution. This effect, also known as the Bar-Eli effect, occurs generically in a broad class of systems when the individual oscillators are near a supercritical Hopf bifurcation. For the effect to occur, the oscillators have to be sufficiently different from each other in natural frequency. In the case of rotor blades, for example, it has been demonstrated analytically and experimentally that by mistuning the blades by making their stiffness different from one another, then the flutter boundary can be delayed dramatically.

Based on nonlinear eigenvalue analysis of compliant plate seal dynamics, the inventors have determined that the coupled dynamics of compliant plates in a ring topology and the self-exciting nature of vortex induced vibrations introduces the possibility of mitigating instabilities in compliant plate seals by approaching amplitude death if certain requirements are met. These conditions include the following: (a) sufficient variability in natural frequencies of the individual plates (the variability may be provided by either varying the structural stiffness of individual compliant plates, or by circumferentially varying the self-correcting stiffness of the system by having a non-uniform intermediate plate front gap and back gap); and/or (b) a time delay between consecutive plates that can be introduced by designing the gap between the plates and the natural frequencies of the plates. By modeling the compliant plate seal as a ring of a large number of locally coupled oscillators with non-linear stiffness arising from hydrostatic feedback, vortex-induced flutter, which occurs when the vortex shedding frequency becomes close to one of the natural frequencies of vibration of the seal, can be reduced, or eliminated. Introducing the natural frequency variability moves the response of the system from a "phase lock" regime to an "amplitude death" regime.

Figure 2A:
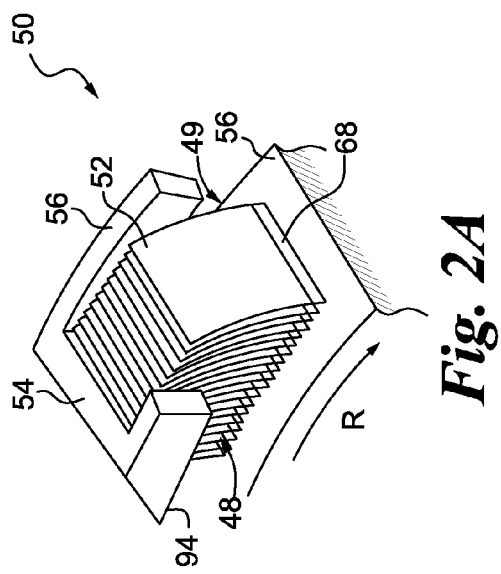
FIG. 2A is a perspective view of an example compliant seal assembly in accordance with aspects disclosed herein.
Figure 2:
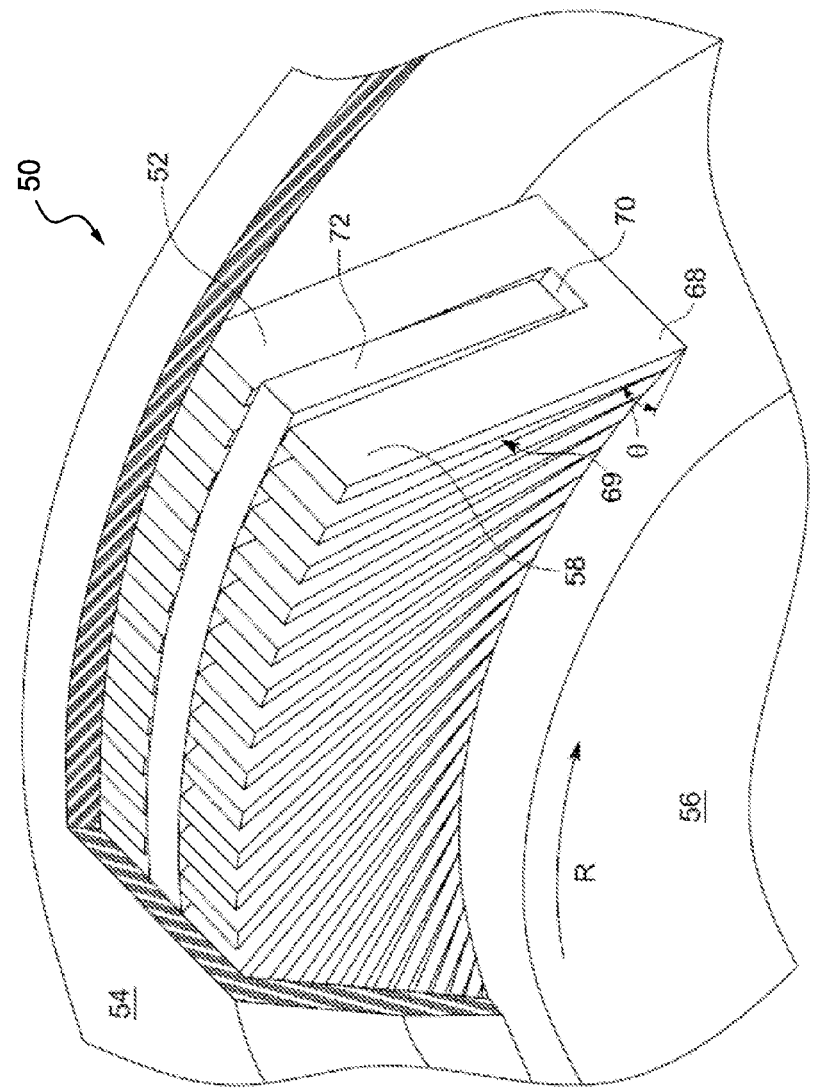
FIG. 2 is a perspective view of an example compliant seal assembly in accordance with aspects disclosed herein.
Figure 3:
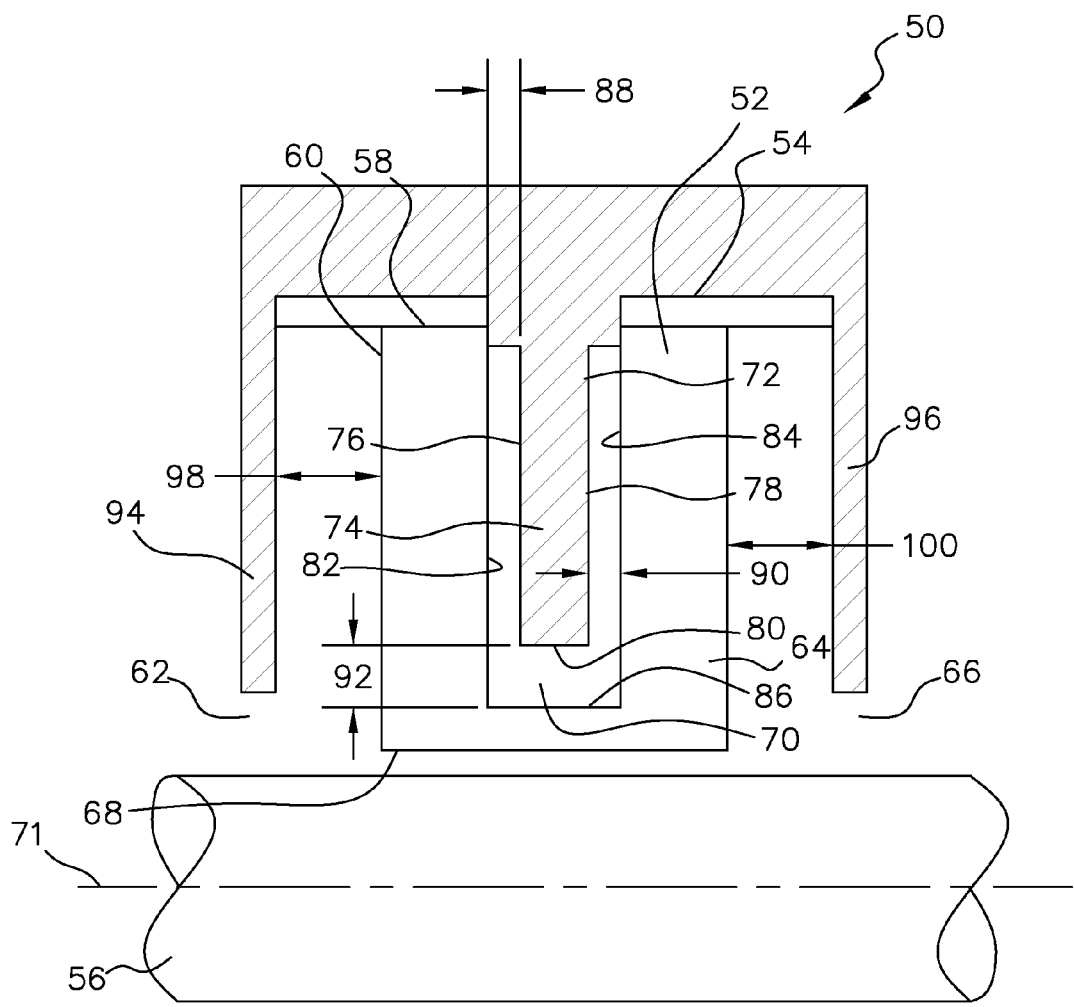
FIG. 3 is a cross-sectional view of the compliant seal assembly of FIG. 2 in accordance with aspects disclosed herein.
Figure 4:
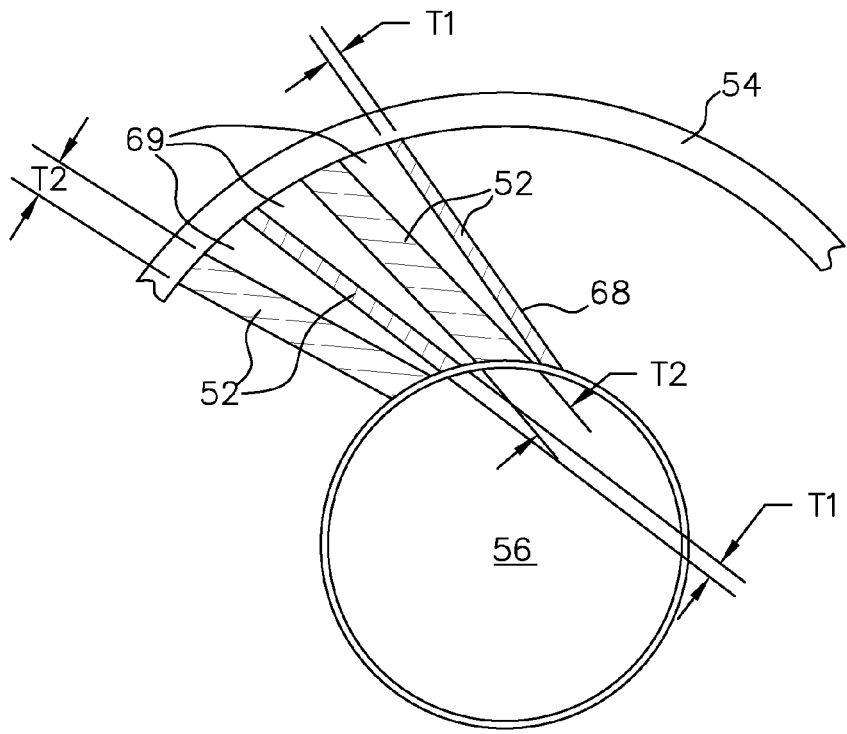
FIG. 4 illustrates a cross sectional view of compliant seal assembly according to one example of the present technology.

Referring to FIGS. 2-4, an example of a compliant seal assembly 50 in accordance with the present technology includes compliant plates 52 attached to a stator 54 or a stationary component at the seal outer diameter in a circumferential fashion around a rotor 56. The compliant plates 52 are secured at their roots 58, in a facing relation (i.e., face-to-face) to the stator 54. The root 58 refers to the end of the compliant plate that is attached to the stator 54. As used herein, the term "facing relation" refers an orientation in which a first side surface of one compliant plate is adjacent to a second side surface of an immediate adjacent compliant plate. Each side surface extends from a leading surface 60 at a high-pressure side 62 to a trailing surface 64 at a low-pressure side 66 of each compliant plate 52, and from the root 58 to a tip 68 of each compliant plate 12. The tip 68 refers to the free end of the compliant plate 52 that is in close proximity to the rotor 56.

The compliant plates are substantially parallel to the axis 71 of the rotor 56, and an intermediate plate member 72 is concentric with the rotor 56. The compliant plates 52 can be oriented at an angle with respect to the radial direction of the rotor 56 such that the complaint plate 52 from the tip 68 to the root 58 leans towards the opposite direction of the of the shaft rotation R. The angle that the compliant plate 52 makes with the circumferential direction of the rotor 56 is known as the cant angle $\theta$, which may be, for example about 30° to about 60°.

The compliant plates 52 have a slot 70 extending a length from the root 58 towards the tip 68. The slot 70 does not extend to the tip 68. The seal assembly 50 further includes the intermediate plate member 72 that extends into the slots 70 of the compliant plates 52. The intermediate plate member 72 acts as a barrier to axial leakage flow between the compliant plates 52. More specifically, the intermediate plate member 72 extends circumferentially about stator 54, and extends radially inward from stator 54 towards rotor 56. In the example shown, the intermediate plate member 72 includes at least one annular ring 74 that is coupled to the stator 54 and extends radially into the slots 70. In alternative examples, the seal assembly can include a plurality of the slots and a plurality of the annular rings with varying dimensions such that each annular ring extends into a respective slot, as disclosed in, for example, U.S. Pat. No. 8,162,324. In another alternative example shown in FIG. 2A, the seal assembly does not include an intermediate member in the stator 52 and the compliant plates 52 do not include a slot or slots that receive an intermediate member or members.

The annular ring 74 includes a leading surface 76 facing the high-pressure side 62, a trailing surface 78 facing the low pressure side 66, and a tip 80. The slot 70 includes a first surface 82 that faces the leading surface 76 of the annular ring 74, a second surface 84 that faces the trailing surface 78 of the annular ring 74, and a third surface 86 that faces the tip 80 of the annular ring 74. An intermediate plate front gap 88 is defined between the first surface 82 of the slot 70 and the leading surface 76 of the annular ring 74. An intermediate plate back gap 90 is defined between the second surface 84 of the slot 70 and the trailing surface 78 of the annular ring 74. A bridge gap 92 is defined between the third surface 86 of the slot 70 with the tip 80 of the annular ring 74. As used herein the terms "front" and "back" refer to the direction of the fluid flow, i.e. from left to right in FIGS. 2-4, such that a position upstream in the flow is the front and a position downstream in the flow is the back.

The seal assembly 50 may further include a front ring 94 and a back ring 96, both coupled to the stator 54. The front ring 94 extends circumferentially across the leading surfaces 60 of the compliant plates 52 and the back ring 96 extends circumferentially across the trailing surfaces 64 of the compliant plates 52. A gap defined between front ring 94 and leading surfaces 60 is referred as the front ring gap 98, and a gap defined between back ring 96 and trailing surfaces 64 is referred as the back ring gap 100. The front ring gap 98 and the back ring gap 100 may be made small or large. In the example shown in FIGS. 2 and 4, the behavior of the seal 50 does not depend on the front ring gap 98 and the back ring gap 100. In the example shown in FIG. 2A, the behavior of the seal 50 does depend on the front ring gap between the front ring 94 and the leading surface 48 and the back ring gap between the back ring 96 and the trailing surface 49 of the compliant plates 52.

The compliant plates 52 are substantially parallel to the axis 71 of the rotor 56 or may be arranged at an angle with respect to the axis 71 of the rotor 56. The annular ring 74 is concentric with the rotor 56. The tips 68 of adjacent compliant plates 52 are separated by a small gap so that they are free to move in the radial direction. The compliant plates 52 have a significantly higher ratio of axial stiffness to radial stiffness compared to the bristles in a brush seal. As shown in FIG. 4, alternating compliant plates may have varying thicknesses T1, T2. The thicknesses T1, T2 may vary in a range of from about 5% to about 100%. The variation in the thickness exceeds the variation that would be provided by, for example, manufacturing tolerances in the case of the prior art in which the compliant plates are formed to have the same thickness within the manufacturing tolerances. It should also be appreciated that in addition, or alternate, to the thickness variation, the natural frequency variation of the compliant plates may be provided by, for example, differences in material or attachment method.

Figure 4A:
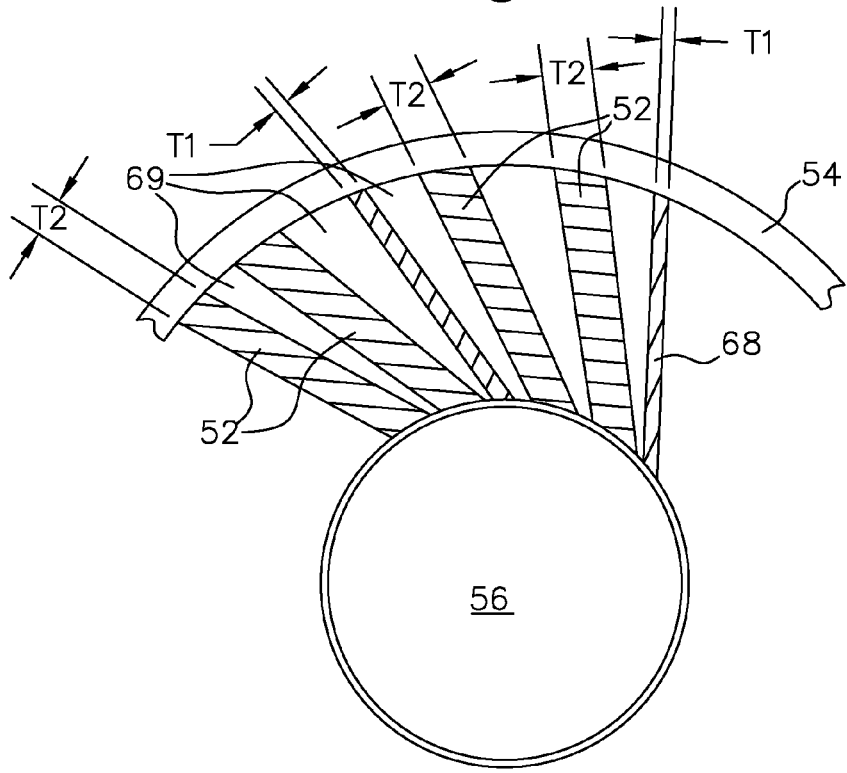
FIG. 4A illustrates a cross sectional view of a compliant seal assembly according to one example of the present technology.
Figure 4B:
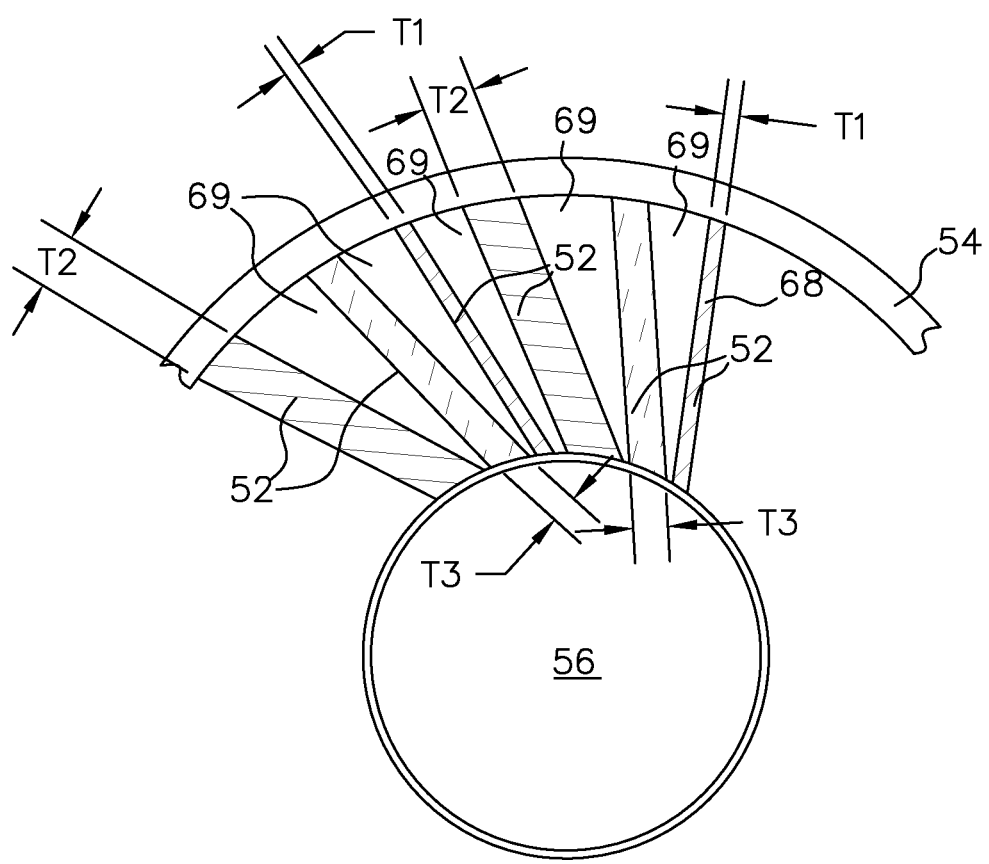
FIG. 4B illustrates a cross sectional view of a compliant seal assembly according to one example of the present technology.

It should be appreciated that the varying thickness of the compliant plates 52 may be other than as shown in FIG. 4, i.e. the thickness of the compliant plates may not vary in a strictly alternating manner, but rather the thickness of the compliant plates may vary throughout the entire circumference of the compliant plate seal. For example, as shown in FIG. 4A, the compliant plates may have thickness distribution of T1, T2, T2, T1, T2, T2. As another example shown in FIG. 4B, the compliant plates may have a thickness distribution of T1, T3, T2, T1, T3, T2. Although thickness T3 is shown in FIG. 4B as being intermediate the thickness T1 and the thickness T2, it should be appreciated that the thickness T3 may be less than the thickness T1 or larger than the thickness T2. It should also be appreciated that the distribution of the thicknesses of the compliant plates need not follow a repeating pattern, but instead may be provided in a statistical pattern or distribution to achieve the reduced oscillation state between the compliant plates (i.e. amplitude death).

Figure 5:
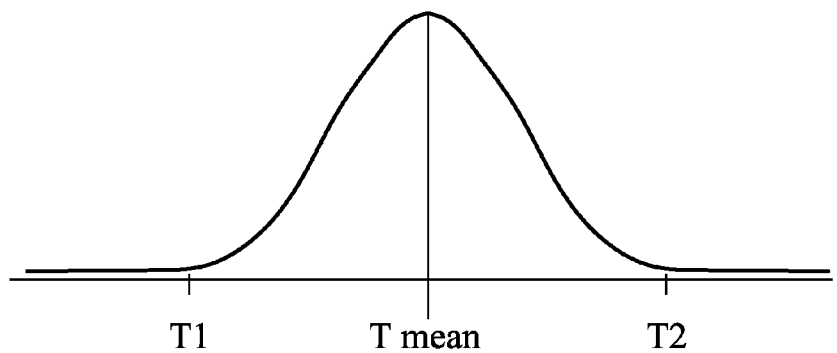
FIG. 5 illustrates a variation in thickness of compliant plates according to one example of the present technology.

Referring to FIG. 5, the thickness T of the compliant plates may be provided over a range of values. For example, the plates may have a mean thickness Tmean (e.g. about 0.5 mm) and the thickness of the compliant plates may randomly distributed with a standard deviation that is 5% to 100% of the mean thickness.

The annular ring 74 may be a continuous 360° ring concentric with the rotor 56. In other embodiments, the annular ring 74 can be split into several segments such as 6 segments of about 60° each or 4 segments of about 90° each.

Due to the structural of the compliant plates with the intermediate plate discussed above, it is possible to introduce passive feedback in the hydrostatic forces acting on the compliant plates. When the tip clearance is small there is an effective hydrostatic lift force on the compliant plates that causes the clearance to increase. When the tip clearance is large, there is an effective hydrostatic blow-down force on the compliant plates causing the clearance to reduce. This "self-correcting behavior" causes the compliant plates to settle at a small tip clearance, thereby providing a low leakage, high differential pressure capability and robust non-contact operation even in the presence of large rotor transients. This is a predominantly hydrostatic phenomenon and hence the seal can reliably maintain non-contact operation for forward rotation, reverse rotation, or no rotation. The self-correcting behavior has a very high natural frequency (e.g. >1000 Hz) and as a result, the compliant plate seal can maintain non-contact operation even in the presence of large high-frequency rotor transients.

Coupling, i.e. contact, between consecutive compliant plates is through either the intervening fluid or through contact. In both cases, there is a finite delay introduced by the time scales of the processes involved. The time delay introduced by the dynamics of the intervening fluid is of the order of inter-plate gap divided by the sound velocity in the medium. This delay is significantly smaller than the observed period of vibrations of the compliant plate seals. On the other hand, the coupling introduced by plate-to-plate contact has a time scale comparable to the plate vibrations. Plate to plate impact during vibrations leads to non-smooth dynamics that can cause grazing bifurcations and chaotic response under certain operating conditions.

In order to qualitatively understand the effect of contact, the phenomenon may be modeled as a delayed coupling to captures the first order effects of contact on the system level dynamics, whereby the gap between consecutive plates determines the phase difference, or the time delay between their displacements. For a compliant plate seal, the time delay will be of the order of the ratio of the plate gap and the limit cycle amplitude, divided by the oscillation frequency.

A varying gap 69 can be formed between the adjacent compliant plates 52. The gaps 69 between adjacent compliant plates 52 can increase along the length of the compliant plates 52 from the tip 68 of the compliant plates 52 to the root 58 of the compliant plates 52. The compliant plates 52 can be oriented at an angle with respect to the radial direction of the rotor 56 such that the complaint plate 52 from the tip 68 to the root 58 lean in a direction opposite to the direction of the rotation R of the rotor 56. The gaps 69 may be designed to provide a natural frequency variation of the compliant plates that results in amplitude death, i.e. a zero-oscillation state between adjacent compliant plates.

Figure 6:
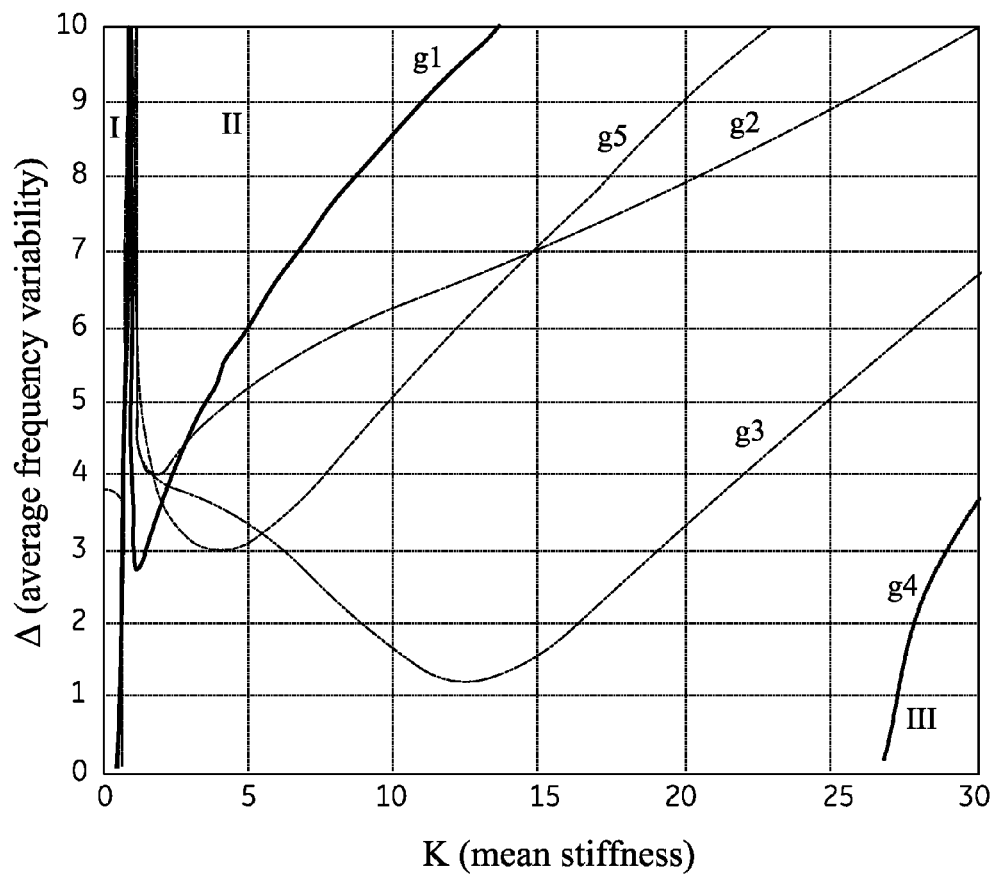
FIG. 6 illustrates a relationship between a mean stiffness of the compliant plates and an average frequency variation of the compliant plates.
Figure 7:
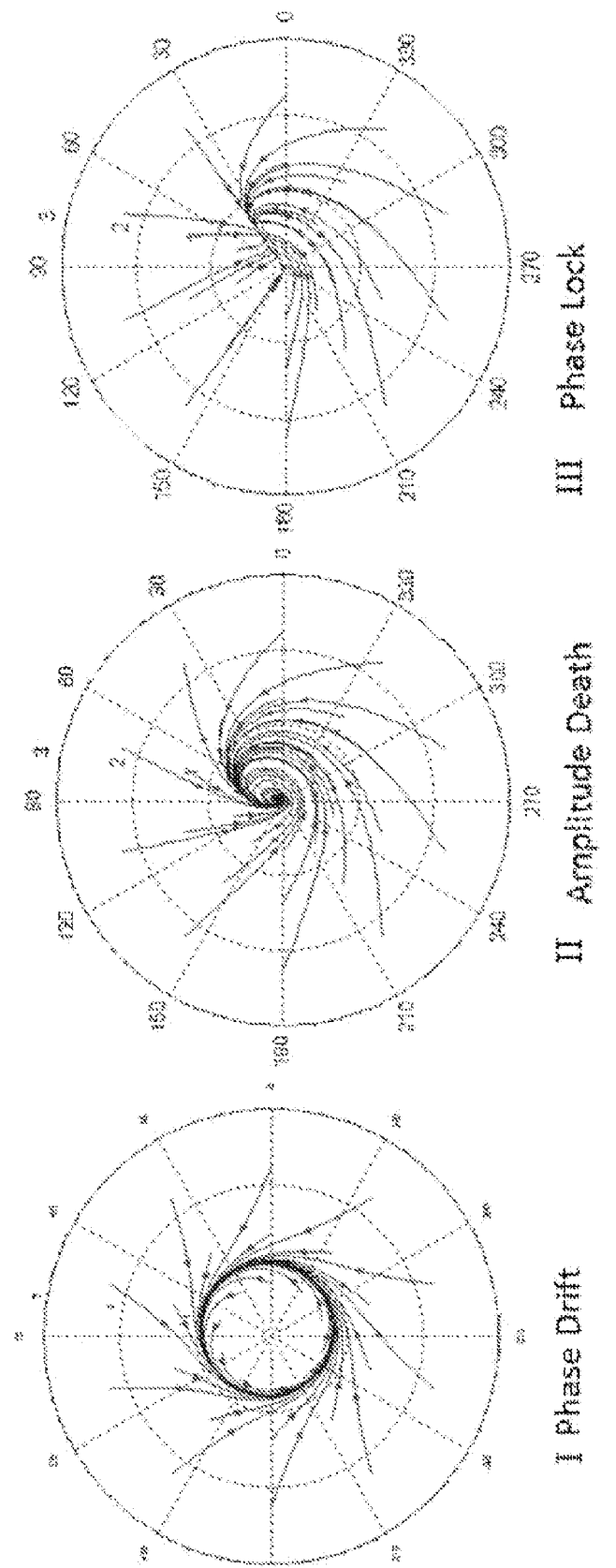
FIG. 7 is a phase portrait showing symmetric amplitude and phase difference between two compliant plates exhibiting (I) phase drift, (II) amplitude death, and (III) phase locking.

Referring to FIGS. 6 and 7, the coupling of the compliant plates is dependent on the gap, the mean (i.e. average) stiffness K of the compliant plates, and the average frequency variability A of the compliant plates. The gaps g1-g5 are in increasing order of size. In the region I, the compliant plates are in phase drift and phase differences between adjacent plates move through all of the phases periodically, so the compliant plates appear to be uncoupled. In region III, the phase difference between adjacent compliant plates is constant, or locked, but the amplitude is non-zero. In region II, a zero oscillation state (i.e. amplitude death) is achieved. When the oscillation state of the compliant plates approaches region II (amplitude death) from region I (phase drift), the amplitude of the limit cycles becomes zero. When the oscillation state of the compliant plates approaches region II (amplitude death) from region III (phase lock), the phase-locked amplitude of the compliant plates reaches a zero value.

The compliant plate seals disclosed herein may reduce the severity of the instabilities discussed above and may lead to more stable design and expand the regime of operation of the seal. By approaching amplitude death, i.e. zero-oscillation state, the compliant plate seals disclosed herein reduces, or eliminates, the most significant synchronized component of compliant plate vibration. This reduces, or prevents, excessive stresses, and resultant premature high cycle fatigue that is a major reliability and life issue in compliant plate seals.

It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the present technology have been illustrated and described herein, many modifications and changes will occur to those skilled in the art. It is therefore to be understood that the appended claims are intended to cover all such modifications and changes.

The invention claimed is:

1. A compliant plate seal assembly for a turbo machine, comprising:
   a rotor:
   a stationary component; and
   a plurality of compliant plates coupled circumferentially to the stationary component in a single annular pack completely surrounding the rotor, wherein each compliant plate has a natural frequency, and wherein variations of the natural frequencies of the compliant plates due to differing thicknesses of the compliant plates and variations of the thickness of gaps between each compliant plate are configured to produce a zero-oscillation state between adjacent compliant plates of the plurality of compliant plates in normal flow.

2. The compliant plate seal assembly of claim 1, wherein a thickness of each compliant plate is randomly distributed with a standard deviation that is 5% to 100% of the mean thickness.

3. The compliant plate seal assembly of claim 2, wherein the compliant plates are randomly arranged around the stationary component.

4. The compliant plate seal assembly of claim 2, wherein the compliant plates are arranged in a pattern around the stationary component.

5. The compliant plate seal assembly of claim 1, wherein a thickness of each compliant plate varies by about 5% to about 100% of a thickness of adjacent compliant plates.

6. The compliant plate seal assembly of claim 1, wherein an intermediate plate extends from the stationary component into slots of the compliant plates.

7. The compliant plate seal assembly of claim 6, wherein a front gap between a first surface of the slot and a leading surface of the intermediate plate is non-uniform with a back gap between a second surface of the slot and a trailing edge of the intermediate plate for each compliant plate.

8. The compliant plate seal assembly of claim 1, wherein each gap further varies from the stationary element to the rotor.

9. The compliant plate seal assembly of claim 1, wherein the at least some of the compliant plates are formed of different materials.

10. The compliant plate seal assembly of claim 2, wherein the mean thickness is about 0.5 mm.

11. The compliant plate seal assembly of claim 1, wherein each compliant plate makes a cant angle with a circumferential direction of the rotor between about 30 and about 60°.

12. The compliant plate seal assembly of claim 11, wherein the cant angles are oriented with respect to a radial direction of the rotor such that the compliant plates lean in a direction opposite to a direction of rotation of the rotor.

13. The compliant plate seal assembly of claim 1, wherein the compliant plates are oriented at an angle with respect to a radial direction of the rotor such that the compliant plates lean in a direction opposite to a direction of rotation of the rotor.

14. The compliant plate seal assembly of claim 1, wherein a thickness of each compliant plate is randomly distributed with a standard deviation that is 5% to 100% of the mean thickness and a thickness of each compliant plate varies by about 5% to about 100% of a thickness of adjacent compliant plates.

15. The compliant plate seal assembly of claim 14, wherein the mean thickness is about 0.5 mm.

16. The compliant plate seal assembly of claim 14, wherein an intermediate plate extends from the stationary component into slots of the compliant plates and a front gap between a first surface of the slot and a leading surface of the intermediate plate is non-uniform with a back gap between a second surface of the slot and a trailing edge of the intermediate plate for each compliant plate.

17. A turbo machine, comprising:
   a compliant plate seal assembly according to claim 1.

* * * * *